US009152202B2

(12) United States Patent
Seinfeld et al.

(10) Patent No.: US 9,152,202 B2
(45) Date of Patent: Oct. 6, 2015

(54) MOBILE DEVICE OPERATIONS WITH BATTERY OPTIMIZATION

(75) Inventors: Marc Seinfeld, Fort Lauderdale, FL (US); Chengi Jimmy Kuo, Manhattan Beach, CA (US); Aaron Putnam, Seattle, WA (US); Jeff Williams, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 59 days.

(21) Appl. No.: 13/162,133

(22) Filed: Jun. 16, 2011

(65) Prior Publication Data

US 2012/0324578 A1 Dec. 20, 2012

(51) Int. Cl.
*G06F 1/32* (2006.01)
*H04W 52/02* (2009.01)

(52) U.S. Cl.
CPC .............. *G06F 1/3206* (2013.01); *G06F 1/329* (2013.01); *H04W 52/0264* (2013.01); *Y02B 60/144* (2013.01)

(58) Field of Classification Search
None
See application file for complete search history.

(56) References Cited

U.S. PATENT DOCUMENTS

| 6,363,419 | B1 | 3/2002 | Martin et al. | |
|---|---|---|---|---|
| 7,359,713 | B1 | 4/2008 | Tiwari | |
| 7,769,416 | B2 | 8/2010 | Wei et al. | |
| 7,890,741 | B2 | 2/2011 | Du et al. | |
| 2005/0149749 | A1 | 7/2005 | Van Brabant | |
| 2005/0245245 | A1* | 11/2005 | Sorvari et al. | 455/418 |
| 2008/0114499 | A1 | 5/2008 | Hakim et al. | |
| 2008/0281663 | A1 | 11/2008 | Hakim et al. | |
| 2009/0164810 | A1* | 6/2009 | Kyro et al. | 713/310 |
| 2009/0174367 | A1* | 7/2009 | Tupman et al. | 320/134 |
| 2009/0300616 | A1 | 12/2009 | Sicurello et al. | |
| 2010/0063756 | A1 | 3/2010 | Agrawal et al. | |
| 2010/0257529 | A1 | 10/2010 | Wilkerson et al. | |
| 2011/0083025 | A1* | 4/2011 | Lee | 713/320 |
| 2011/0099392 | A1* | 4/2011 | Conway | 713/300 |
| 2011/0252057 | A1* | 10/2011 | Huang et al. | 707/770 |

(Continued)

FOREIGN PATENT DOCUMENTS

| CN | 1505783 A | 6/2004 |
|---|---|---|
| EP | 1349049 A1 | 10/2003 |

(Continued)

OTHER PUBLICATIONS

Kansal et al., Power Management in Energy Harvesting Sensor Networks, 2007, ACM 1539-9087/2007/09-ART32, pp. 1-26.*

(Continued)

*Primary Examiner* — Jung Kim
*Assistant Examiner* — Adrian Stoica
(74) *Attorney, Agent, or Firm* — Henry Gabryjelski; Kate Drakos; Micky Minhas (57) ABSTRACT

Techniques for conserving battery power in devices are provided. One or more deferrable tasks are queued for later execution. An initiation of a subsequent charging event for a battery of the device is detected. The queued deferrable task(s) are enabled to be executed during the charging event. For instance, the queued deferrable task(s) may be enabled to be executed if the charging event is predicted to be a long duration charging event, such as by referring to a charging profile of the mobile device. In this manner, battery power is conserved while the device is in use and not connected to a battery charger.

21 Claims, 6 Drawing Sheets

(56) References Cited

U.S. PATENT DOCUMENTS

2012/0040712 A1* 2/2012 Toms et al. ............... 455/550.1
2012/0210150 A1* 8/2012 de Lind van Wijngaarden
 et al. ........................... 713/320

FOREIGN PATENT DOCUMENTS

WO 2008058284 A2 5/2008
WO 2008093278 A1 8/2008

OTHER PUBLICATIONS

Clemens Moser, Power Management in Energy Harvesting Embedded Systems, 2009, Swiss Federal Institute of Technology (ETH) Zurich, Diss. ETH No. 18247, pp. 17-31.*

Leo Notenboom, What's the difference between a "quick" and a "full" scan, and which do I want?, 2010, retrieved from http://ask-leo.com/, pp. 1-3.*

"eXtreme Energy Conservation: Advanced Power-Saving Software for Wireless Devices", Retrieved at <<http://www.freescale.com/files/32bit/doc/white_paper/XTMENRGYCNSVWP.pdf>>, Freescale Semiconductor, Inc., Feb. 2006, pp. 15.

Carlson, et al., "SmartReflex™ Power and Performance Management Technologies: Reduced Power Consumption, Optimized Performance", <<Retrieved at http://focus.ti.com/lit/wp/swpy015a/swpy015a.pdf?DCMP=OTC-DSP_eTech_July08&HQS=EtechInnovations+NL+etechjuly08smartreflexwhtpprar>>, Texas Instruments Inc., Feb. 2008, pp. 9.

Ravi, et al., "Context-aware Battery Management for Mobile Phones: A Feasibility Study", Retrieved at <<http://reality.media.mit.edu/pdfs/Ravi.pdf, Retrieved Date: Apr. 1, 2011, pp. 16.

Oberheide, et al., "Virtualized In-Cloud Security Services for Mobile Devices", Retrieved at <<http://citeseerx.ist.psu.edu/viewdoc/download?doi=10.1.1.169.5857&rep=rep1&type=pdf>>, Proceedings of the First Workshop on Virtualization in Mobile Computing, 2008, pp. 5.

Jansen, et al., "Guidelines on Cell Phone and PDA Security", Retrieved at <<http://csrc.nist.gov/publications/nistpubs/800-124/SP800-124.pdf>>, National Institute of Standards and Technology, U.S. Department of Commerce, Oct. 2008, pp. 51.

"International Search Report", Mailed Date: Jan. 31, 2013, Application No. PCT/US2012/041035, Filed Date: Jun. 6, 2012, pp. 11.

Office Action Received for Russian Federation Patent Application No. 2013155599, Mailed Date: Jan. 27, 2014, Filed Date: Jun. 6, 2012, 3 Pages. (w/o English Translation).

First Office Action and Search Report Received for Chinese Patent Application No. 201280029334.0, Mailed Date: Jul. 3, 2015, 12 Pages.

Supplementary European Search Report Issued in Patent Application No. 12800604.6, Mailed Date: Jul. 15, 2015, 10 Pages.

* cited by examiner

MOBILE DEVICE OPERATIONS WITH BATTERY OPTIMIZATION

BACKGROUND

Mobile devices, also sometimes referred to as handheld devices, are electronic devices that are sized for being carried and/or pocketed by humans. Mobile devices typically include one or more of a fast and capable processor, a rich but small display, wireless communication capability, a touch screen, a reduced size keyboard, and/or other features that enable device mobility. Such mobile devices also tend to contain rechargeable batteries to provide power.

Mobile devices with rechargeable batteries have a constant tension in delivering a rich experience while providing battery life with enough longevity to enable them to deliver their value while on the go (e.g., while not tethered to a battery charger). A user of a mobile device typically desires to transport the mobile device with them, and does not want to have to leave the mobile device behind for charging. However, some mobile device functions, such as security functionality (e.g., virus scanning, backup functionality, etc.), can greatly use the processing resources of mobile devices, and can therefore be costly in terms of battery usage. As a result, such device functions can limit the portability of mobile devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for conserving battery power in battery powered devices, including immobile and mobile devices. Battery power is preserved in such devices by selectively deferring tasks that are determined to be deferrable. The tasks are deferred until a charging event occurs that can support the deferred tasks. When such a charging event occurs, the deferred tasks are enabled to be performed. In this manner, battery usage is reduced while the devices are not connected to a battery charger, enabling increased device mobility.

In one example method implementation, one or more deferrable tasks are queued for later execution. An initiation of a charging event for a battery of a mobile device is detected subsequent to the queuing. The queued deferrable task(s) are enabled to be executed during the charging event. For instance, the queued deferrable task(s) may be enabled to be executed if the charging event is predicted to be a long duration charging event, which may be determined by referring to a charging profile of the mobile device, or by other technique.

In an example system implementation, a task scheduler is provided in a mobile device. The task scheduler includes a task queuing module, a charge monitor, and a queue enabler module. The task queuing module is configured to queue at least one deferrable task for later execution. The charge monitor is configured to detect an initiation of a charging event for a battery of the mobile device subsequent to queuing the deferrable task(s). The queue enabler module is configured to enable the deferrable task(s) to be executed during the charging event.

Computer program products are also described herein for conserving battery power of mobile devices by deferring execution of tasks until a battery charge time, and for further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Many types of battery-powered devices exist, including mobile devices that contain batteries and stationary devices that use battery power. For instance, mobile handheld electronic devices may include a battery, may consume battery power (discharging) during mobile operation, and may be coupled to a charging device to recharge the battery when at rest (not mobile). Operations of these and other types of battery powered devices that occur while consuming battery power (discharging) frequently are performed without awareness for the battery power they consume, let alone how to mitigate that activity. For instance, virus scans and/or software updates frequently are performed at a time when they will not impact foreground activity, but are not configured to incur minimal impact on battery life. As a result, the device battery may become drained during use, and therefore the device may need to be left by the user coupled to the charger. In some instance, virus scanning may be performed based on a response to a virus outbreak, on demand, at scheduled times, etc. These activities are typically "detective" and need not run continuously. Such operations may be run without impacting precious battery power.

In embodiments, techniques are provided for conserving battery power in battery-powered devices, such as mobile devices and other types of battery-powered devices. Note that although embodiments are frequently described herein with reference to mobile devices, such embodiments are described in this manner for purposes of illustration, and are not intended to be limited to mobile devices. Embodiments are also applicable to other types of battery-powered devices (e.g., security systems, control systems, etc.).

In embodiments, device operations may be deferred until the battery of the device is coupled to a battery charger, conserving battery power while the device is mobile or otherwise not coupled to power. Embodiments may take into account different factors to conserve battery power for a battery-powered device, including an AC/DC profiling/usage of the device, and may optimize device functions (e.g., security functions, etc.) to occur as much as possible when the device is taking appropriate advantage of charger power versus battery power, without sacrificing device functionality.

For example, non-real-time, non-proactive security operations and/or other operation may be biased to occur during dedicated/extended charging events/cycles, and may be biased further towards the latter end of such charging events such that if the device is removed from a charger earlier than anticipated, confidence the device has been both charged and "secured" can be attained. In another example, files, applications (e.g., "apps"), and/or installers may be downloaded to a mobile device, and in the case of applications/installers, may not have been run immediately. Indications of the downloads may be cached, and the downloaded files/applications/installers may be scanned during charger time. In this manner, even if the files/applications/installers were installed while the mobile device was running on battery power, any optional evented scan-on-installs may be avoided.

In embodiments, various factors may be used to anticipate when battery charger time will occur, and how long battery charging will likely occur, taking into account how long the security operations and/or other functions that otherwise drain battery power take to occur. Accordingly, times for starting security operations and/or other functions can be anticipated, and utilized to start such execution.

In embodiments, a history of the charging of the device may be monitored to predict subsequent charge events. The history and/or other factors may be used to configure a charging profile for a device to aid in predicting whether a sufficiently long charging event is being performed to enable deferred operations. The charging profile may be determined based on one or more factors, including profile information manually input by a user, static and/or dynamic profiling of ongoing charging history, access and reference to calendar/scheduling (stored on a mobile device and/or remotely), access to a mobile device on-charger API/notification, knowledge of battery charging capacity, charging rate, and a current charge level, and/or a use of other "sensitive/sensory" aspects of the mobile device.

For instance, after a day's use, a mobile device may be placed on a mobile device on a charger at a user's bedside, on a kitchen counter, or in a garage door key drop bureau charger for readiness the next day. Power-draining device operations may be enabled to be performed when the mobile device is recharging the mobile device (and the user is sleeping). Embodiments may be adaptable to any user schedule, including users that work day shift (which may result in nighttime charging), night shift (which may result in daytime charging), and/or any other possible user schedule.

Note that some charge times are not sufficient for enabling deferred tasks to be enabled. For instance, time that a mobile device is charging on a car charger while driving to/from work may not be a suitable time for intensive device security/maintenance operations to be performed. In embodiments, such times may be distinguished so they are not used for performing device operations, such as maintenance/security activity.

Numerous exemplary embodiments of the present invention are described as follows. It noted that any section/subsection headings provided herein are not intended to be limiting. Embodiments are described throughout this document, and any type of embodiment may be included under any section/subsection.

II. Example Embodiments

Embodiments provide techniques for conserving battery power for battery-powered devices such as mobile devices. In particular, embodiments enable deferrable tasks to be deferred until a device is being charged (e.g., is coupled to a battery charger), and therefore has greater access to power resources, rather than performing the tasks during regular usage (e.g., when the mobile device is not coupled to a battery charger, and is therefore mobility-enabled). Such embodiments enable devices to be used for longer periods of time between battery charging cycles. A variety of tasks performed on mobile devices may be considered deferrable, including security operations, maintenance operations, file downloads/installations, and further types of tasks.

Figure 1:
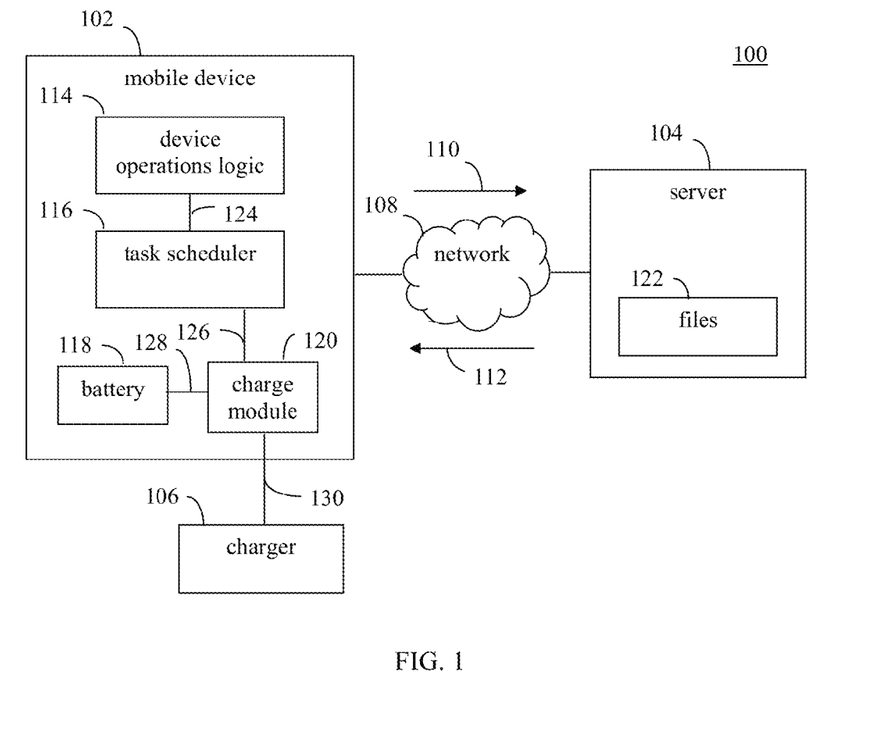
FIG. 1 shows a block diagram of a mobile device environment, according to an example embodiment.

Such embodiments may be implemented in a variety of environments. For instance, FIG. 1 shows a block diagram of a mobile device environment 100, according to an example embodiment. As shown in FIG. 1, environment 100 includes a mobile device 102, a server 104, and a charger 106. Environment 100 is described as follows.

Mobile device 102 may be any type of mobile device, including a mobile computer or computing device (e.g., a Palm® device, a RIM Blackberry® device, a personal digital assistant (PDA), a laptop computer, a notebook computer, a tablet computer (e.g., an Apple iPad™, etc.), a netbook, etc.), a mobile phone (e.g., a cell phone, a smart phone such as an Apple iPhone, a phone that incorporates the Google Android™ platform, a phone that incorporates a Microsoft operating system such as Microsoft Windows Phone 7®, etc.), or other type of mobile device. Mobile device 102 may include one or more processors and/or other processing logic, a display that may include a touch screen, wireless communication capability, a reduced size keyboard, and/or other features that enable mobile device 102 to be mobile (e.g., carried by a human user by hand and/or in a pocket). Server 104 may include one or more servers, which may be any type of computing device described herein or otherwise known that serves files, such as files 122. Files 122 may include various types of files, including data files, web pages, applications, etc.

Mobile device 102 and server 104 are communicatively coupled by network 108. Network 108 may include one or more communication links and/or communication networks, such as a PAN (personal area network), a LAN (local area network), a WAN (wide area network), or a combination of networks, such as the Internet. Mobile device 102 and server 104 may be communicatively coupled to network 108 using various links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc.

Charger 106 is a battery charger that is configured to charge batteries of mobile devices, such as mobile device 102. Charger 106 may be external to mobile device 102, as shown in FIG. 1, or may be partially or entirely internal to mobile device 102. Charger 106 may be coupled to a power source (e.g., 60 Hz 120 V alternating current (AC) power, etc.) to receive an electrical current, and may convert the received electrical current to a charge current at a constant DC (direct current) voltage. As shown in FIG. 1, charger 106 may output the charge current to mobile device 102 over a charge cable 130, although in some implementations, mobile device 102 may include a connector that connects directly to charger 106 without an intervening charge cable.

As shown in FIG. 1, mobile device 102 includes device operations logic 114, a task scheduler 116, at least one battery 118, and an optional charge module 120. Device operations logic 114 includes logic for performing one or more operations in mobile device 102, including security operations, maintenance operations, file downloads/installations, and further types of tasks/operations. Device operations logic 114 may be implemented in various ways to perform the operations, including being implemented in hardware, software, firmware, or any combination thereof. For example, device operations logic 114 may be implemented as computer program code configured to be executed in one or more processors. Alternatively, device operations logic 114 may be implemented as hardware logic/electrical circuitry. In an embodiment, device operations logic 114 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Battery 118 includes one or more rechargeable batteries formed of a material that enables recharging. For example, battery 118 may include a nickel-based rechargeable battery, such as a nickel cadmium (NiCd) or nickel metal hydride (NiMH) battery, a lithium-based rechargeable battery, such as a lithium ion (Li-ion) or lithium ion polymer (Li-ion polymer) battery, or other type of rechargeable battery. Charge in battery 118 can be restored by the application of electrical energy. During mobile operation of mobile device 102, battery 118 may provide power to components of mobile device 102 via a direct current (DC) voltage.

Charge module 120 is optionally present in mobile device 102, and when present, provides an interface between charger 106 and battery 118. Alternatively, charge module 120 may include a portion or all of charger 106. As shown in FIG. 1, charge module 120 may be coupled to charger 106 via charge cable 130 (or other connection) to receive a charge voltage/current from charger 106. Charge module 120 may include regulation and/or protection circuitry (e.g., over-current and/or over-voltage protection, reverse biasing protection, etc.) to protect battery 118 and/or mobile device 102 from being connected to a power source that provides a voltage/current that is not compatible with battery 118. When present, charge module 120 provides a charge current 128 to battery 118 based on a charge current received from charger 106 over charge cable 130 (or other connection). When charge module 120 is not present, charger 106 may provide charge current 128 directly to battery 118.

As shown in FIG. 1, task scheduler 116 may receive a charge indication 126 from charge module 120. When charge module 120 is not present, task scheduler 116 may receive charge indication from charger 106. Charge indication 126 may be a signal generated by charge module 120 or charger 106 that indicates whether charge current 128 is being provided to battery 118, thereby indicating whether battery 118 is being charged. As such, in an embodiment, charge indication 126 may be a digital or analog signal providing the charge indication. In an embodiment, charge module 120 may include a resistor in series with charge current 128. A particular voltage value may be present across the resistor, and provided by charge indication 126, when charge current 128 is flowing to battery 118 to indicate that battery 118 is being charged. In other embodiments, charge indication 126 may indicate whether battery 118 is being charged by charge current 128 in other ways, as would be known to persons skilled in the relevant art(s).

Task scheduler 116 is configured to schedule one or more tasks/operations of device operations logic 114 for operation during periods of time when battery 118 is being charged. For instance, task scheduler 116 may be configured to enable deferrable tasks to be deferred until battery 118 of mobile device 102 is being charged by charger 106, and therefore mobile device 102 has access to greater power resources that just battery 118, rather than performing the tasks during regular usage (e.g., when mobile device 102 is not coupled to charger 106).

Task scheduler 116 may generate a task enable signal 124 that is received by device operations logic 114. Task enable signal 124 may enable a deferred task of device operations logic 114 to be performed. For instance, task scheduler 116 may determine from charge indication 126 that battery 118 is being charged, and as a result, may generate task enable signal 124 to enable one or more tasks deferred by device operations logic 114 to be performed. In this manner, the deferrable tasks are performed while battery 118 is being charged, thereby conserving battery resources during the times that battery 118 is not being charged. Task scheduler 116 may generate task enable signal 124 to enable the deferred tasks immediately when a suitable charge event is detected, or may delay generating task enable signal 124 to enable the deferred tasks until a later portion of the charge event (e.g., after battery 118 has been charged to a desired level, as may be indicated on charge indication 126, or as may be determined in other manner).

Figure 2:
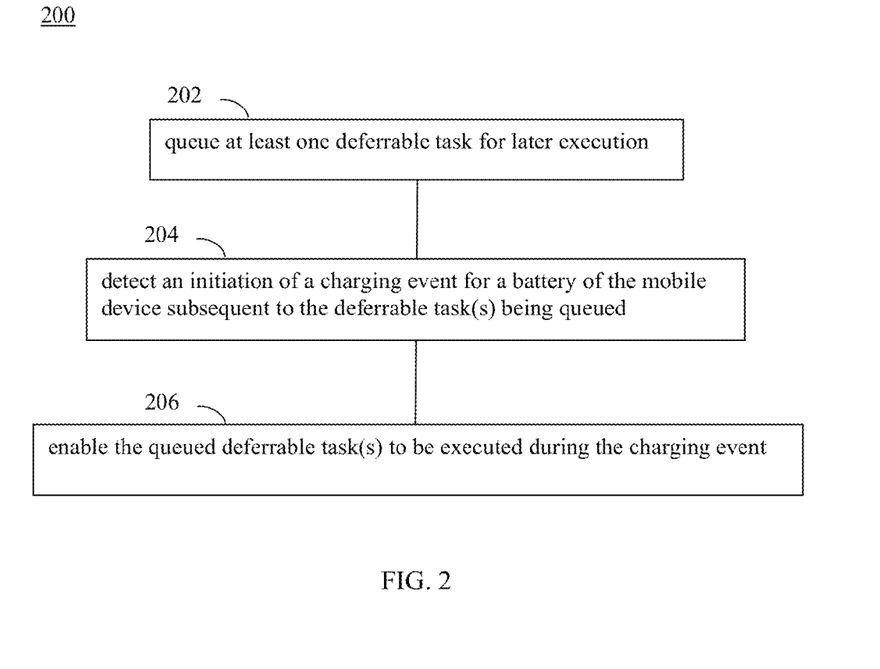
FIG. 2 shows a flowchart providing a process in a mobile device for scheduling device tasks for more efficient battery usage, according to an example embodiment.
Figure 3:
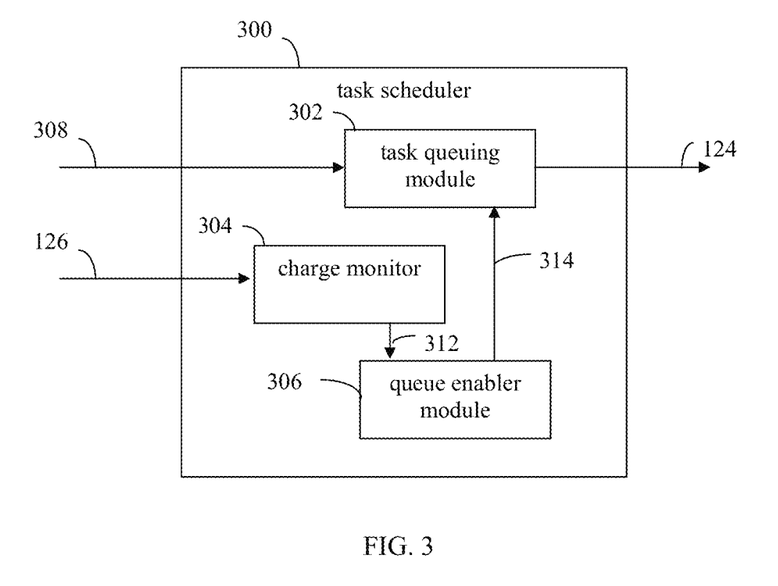
FIG. 3 shows a block diagram of a task scheduler, according an example embodiment.

Task scheduler 116 may perform its functions in various ways, in embodiments. For instance, FIG. 2 shows a flowchart 200 providing a process for scheduling tasks for greater battery efficiency in a mobile device, according to an example embodiment. In an embodiment, flowchart 200 may be performed by task scheduler 116 of FIG. 1. Flowchart 200 is described as follows with reference to environment 100 of FIG. 1 and with reference to FIGS. 3-8. For instance, FIG. 3 shows a block diagram of a task scheduler 300, according an example embodiment. Task scheduler 300 of FIG. 3 is an example of task scheduler 116 of FIG. 1. As shown in FIG. 3, task scheduler 300 includes a task queuing module 302, a charge monitor 304, and a queue enabler module 306. Further structural and operational embodiments will be apparent to persons skilled in the relevant art(s) based on the following discussion regarding flowchart 200.

Flowchart 200 begins with step 202. In step 202, at least one deferrable task is queued for later execution. For example, with reference to FIG. 1, device operations logic 114 may be requested to perform a task by a user of mobile device 102 (e.g., by the user interacting with a user interface of mobile device 102) or may be configured to perform a task for other reason (e.g., in response to a file download, at a predetermined time, etc.).

Figure 4:
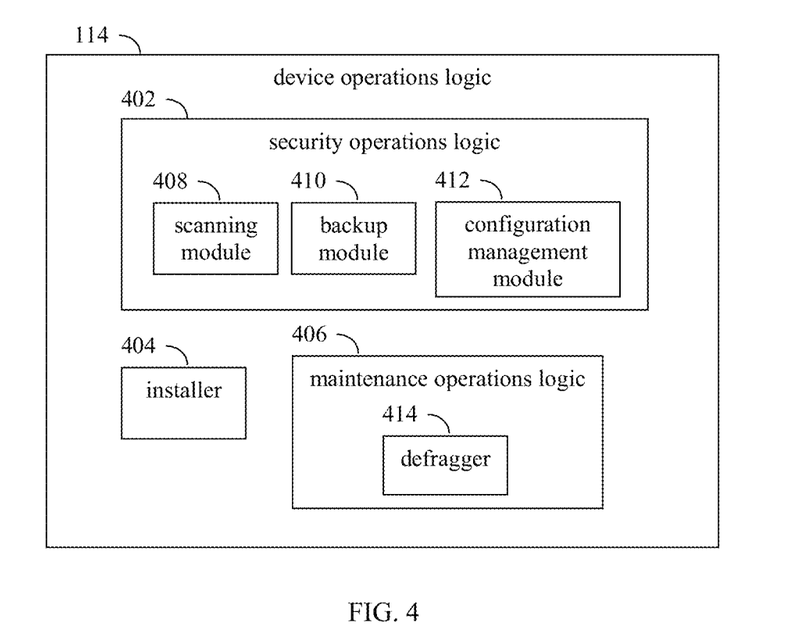
FIG. 4 shows a block diagram of device operations logic, according to an example embodiment.

As described above, device operations logic 114 may be configured to perform a variety of tasks that are deferrable. For instance, FIG. 4 shows a block diagram of device operations logic 114, according to an example embodiment. As shown in FIG. 4, device operations logic 114 includes security operations logic 402, an installer 404, and maintenance operations logic 406. Security operations logic 402, installer 404, and maintenance operations logic 406 are each configured to perform tasks for mobile device 102, as described below. Each of security operations logic 402, installer 404, and maintenance operations logic 406 may include deferrable tasks. Deferrable tasks are those tasks that do not need to be performed immediately because operation of mobile device 102 will not be impaired by performing them later, and because they have not been requested by a user of mobile device 102 to be performed immediately. As such, deferrable tasks may be performed at a later time (as determined by task scheduler 300). In embodiments, device operations logic 114 may include one or more of these features shown in FIG. 4 that may include deferrable tasks, and/or may include further or alternative features that include deferrable tasks.

Security operations logic 402 includes logic for performing one or more security related operations for mobile device 102. For instance, as shown in FIG. 4, security operations logic 402 may include a scanning module 408, a backup module 410, and/or a configuration management module 412. Scanning module 408 is a virus scanning module that is configured to perform virus scanning tasks on files that are downloaded to mobile device 102 (e.g., files 122 downloaded from server 104 in FIG. 1). Commercially available examples of scanning module 408 are known to persons skilled in the relevant art(s). Backup module 410 is configured to perform backup tasks for files in storage of mobile device 102 to remote storage (not shown in FIG. 1). Commercially available examples of backup module 410 are known to persons skilled in the relevant art(s). Configuration management module 412 is configured to perform configuration management tasks for mobile device 102. Commercially available examples of configuration management module 412 are known to persons skilled in the relevant art(s). Further example tasks for security operations logic 402 will be known to person skilled in the relevant art(s).

Note that in embodiments, scanning module 408 may be configured to perform full scans of files and/or may be configured to perform "lightweight" scans, where a file is less completely scanned for viruses. For instance, scanning module 408 may perform a lightweight scan on a file to generate a scan result. The scan result may be a hash of the file, or other result that may be analyzed to make a determination with sufficient likelihood whether the file contains a virus. The scan result may be transmitted to a remote server for analysis, such as server 104 shown in FIG. 1. The server may analyze the scan result (e.g., the hash result, etc.), to determine whether the file may have a virus. This analysis may be performed in various ways, as would be known to persons skilled in the relevant art(s). An indication may be received from the remote server whether the file is malicious, based on the analysis. If the remote server indicates that the file is malicious, the file may be quarantined, deleted, or otherwise disabled from causing harm to mobile device 102 by scanning module 408. If the remote server indicates that the file is not malicious, a full scan task may be performed on the file. The full scan task may be deferred for later execution as a deferrable task, as described herein.

Installer 404 is configured to perform installation (and/or setup) of applications (e.g., computer programs), which may include installation and/or setup of drivers, plug-ins, etc., onto mobile device 102 so that the applications can be executed. Installer 404 may download applications (e.g., from a server such as server 104 in FIG. 1), and/or install the downloaded applications on mobile device 102. Installer 404 may also be configured as an application updater that updates applications that are already loaded on mobile device 102. For instance, installer 404 may download the updates (e.g., from a server such as server 104), and install the updates to applications on mobile device 102. Commercially available examples of installer 404 are known to persons skilled in the relevant art(s).

Maintenance operations logic 406 includes logic for performing one or more maintenance related operations for mobile device 102. For instance, as shown in FIG. 4, maintenance operations logic 406 may include a defragger 414. Defragger 414 is a defragmentation module that is configured to perform defragging tasks on a file system of mobile device 102 to reduce fragmentation. Commercially available examples of defragger 414 are known to persons skilled in the relevant art(s). Further example tasks for maintenance operations logic 406 will be known to person skilled in the relevant art(s).

In an embodiment, according to step 202, one or more deferrable tasks are queued for later execution. For instance, during operation, device operations logic 114 may determine that a task (e.g., a security task, an install task, a maintenance task, etc.) is to be performed. For instance, a file download task may be desired to be performed (e.g., by installer 404) to download one or more files to mobile device 102. Alternatively, a file may have already been downloaded to mobile device 102 (e.g., from server 104 in FIG. 1), and security operations logic 402 may be configured to perform a security operation on the file, installer 404 may be configured to install an application associated with the file, etc. Alternatively, backup module 410 may be configured to perform a backup task for mobile device 102, maintenance operation logic 406 may be configured to perform a configuration management task, etc. As such, as shown in FIG. 3, task queuing module 302 may receive a perform task request 308 from device operations logic 114 that indicates that any one or more of these tasks, or other tasks, desired to be performed by device operations logic 114.

Task queuing module 302 is configured to evaluate perform task request 308 to determine whether the indicated task can be deferred. For instance, in an embodiment, task queuing module 302 may compare the task indicated by perform task request 308 to a predetermined list of deferrable tasks (stored in storage of mobile device 102), and if the indicated task matches a task in the predetermined list of deferrable tasks, task queuing module 302 may determine that the indicated task may be deferred. For instance, perform task request 308 may include a task identifier (task ID) for the indicated task, and the predetermined list of deferrable tasks may include task identifiers for each of the listed deferrable tasks. If the task identifier for the indicated task matches an identifier for a task in the list of deferrable tasks, task queuing module 302 may determine that the indicated task may be deferred. If a match does not occur, task queuing module 302 may determine that the indicated task may not be deferred.

Furthermore, task queuing module 302 may determine whether a user of mobile device 102 is requesting that the indicated task be performed immediately. In such case, the indicated task would not be deferrable. For instance, the user may be interacting with a user interface (e.g., a keyboard, a touch screen, voice activated control, etc.) of mobile device 102 to request that the task be performed. The user may be interacting with a security operations tool interface, a browser or other file downloading/installer interface, a maintenance tool interface, and/or other interface provided by mobile device 102 to request that a task be performed. If task request 308 is received by task queuing module 302, and indicates that a user has indicated that the task be performed immediately, task queuing module 302 may determine that the indicated task may not be deferred. If task request 308 is received from a user interface of mobile device 102, but does not indicate that the user has indicated that the task be performed immediately, task queuing module 302 may determine that the indicated task may be deferred.

In other embodiments, task queuing module 302 may determine whether a task is deferrable in other ways. For instance, if task queuing module 302 determines that the indicated task invokes security operations logic 402 (e.g., scanning module 408, backup module 410, configuration management module 412, etc.), installer 404, or maintenance operations logic 406 (e.g., defragger 414), or other designated operation or task, task queuing module 302 may determine the task to be deferrable.

If a task is determined to be deferrable, task queuing module 302 adds the task to a deferred task queue (e.g., stored in storage of mobile device 102), which may contain any number of queued deferrable tasks. As shown in FIG. 3, task queuing module 302 generates task enable signal 124, which may be received by device operations logic 114 of FIG. 1. If a task is determined to not be deferrable, task queuing module 302 generates task enable signal 124 to indicate to device operations logic 114 that the task is enabled, and may be executed. If a task is determined to be deferrable, task queuing module 302 generates task enable signal 124 to indicate to device operations logic 114 that the task is not enabled, and is to be deferred until later enabled by task queuing module 302.

Referring back to FIG. 2, in step 204 of flowchart 200, an initiation of a charging event is detected for a battery of the mobile device subsequent to the deferrable task(s) being queued. For instance, as shown in FIG. 3, charge monitor 304 may receive charge indication 126, which indicates that a charge is being applied to battery 118 (FIG. 1). In response, charge monitor 304 may generate a charge event indication 312, which is received by queue enabler module 306. Note that in one embodiment, charge monitor 304 may output charge event indication 312 as soon as a received charge current is indicated by charge indication 126. In another embodiment, charge monitor 304 may delay generating charge event indication 312 until charge indication 126 indicates that a charge current is received for a predetermined amount of time (e.g., in terms of several seconds, several minutes, etc.). In this manner, relatively short duration or intermittent charge events are filtered out by charge monitor 304. In still another embodiment, charge monitor 304 may not be present, and instead queue enabler module 306 may perform step 204. In such an embodiment, queue enabler module 306 may receive charge indication 126 directly.

In step 206, the queued deferrable task(s) is/are enabled to be executed during the charging event. For instance, as shown in FIG. 3, queue enabler module 306 receives charge event indication 312 (or charge indication 126). Queue enabler module 306 is configured to enable deferrable tasks that are queued by task queuing module 302 to be executed during a charge event indicated by charge event indication 312. As shown in FIG. 3, if queue enabler module 306 determines that a suitable charge event is occurring, queue enabler module 306 generates deferred task enable signal 314, which indicates that deferrable tasks queued by task queuing module 302 may be enabled. Task queuing module 302 receives deferred tasks enable signal 314. As a result, task queuing module 302 generates task enable signal 124 to indicate to device operations logic 114 that the one or more queued deferrable tasks are enabled. If multiple deferred tasks are queued, task queuing module 302 may enable the queued deferrable tasks simultaneously or serially in any order, such as in an order in which the tasks are added to the queue (e.g., first-in first-out (FIFO)), in a last-in first-out (LIFO) order, in an order in which the most resource intensive tasks are performed last or are performed first, in an order dictated by the tasks themselves (e.g., performing a cleanup task prior to an install task, performing a signatures download task before a scan task, etc.), or in any other order. After enabling the queued deferrable tasks to be performed, task queuing module 302 may clear the enabled tasks from the deferred tasks queue.

Queue enabler module 306 may determine whether to enable the queued deferrable tasks to be executed based on charge event indication 312 (or charge indication 126) in any manner. For instance, queue enabler module 306 may enable the queued deferred tasks if queue enabler module 306 determines that a charge event indicated by charge event indication 312 is a sufficiently long duration charge event so that the deferred tasks have enough time to be performed. A long duration charge event is longer than a charging event that may occur during an intermittent or short term connection of battery 118 to charger 106. For instance, a long duration charge event may be a charge event that is sufficiently long enough for at least one of the queued deferrable tasks to be performed/executed during the charging event, without battery 118 and charger 106 being decoupled during the charging event.

Figure 5:
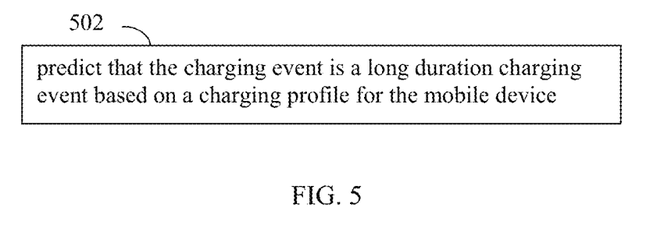
FIG. 5 shows a process for predicting whether a charging event is suitable for deferred tasks to be executed, according to an example embodiment.
Figure 6:
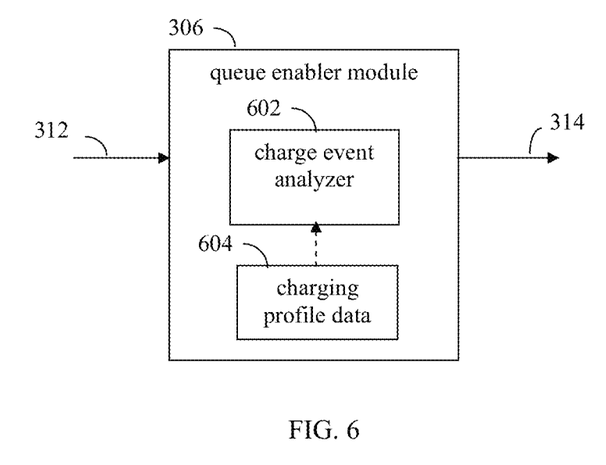
FIG. 6 shows a block diagram of a queue enabler module that includes a charge event analyzer, according to an example embodiment.

In an embodiment, queue enabler module 306 may perform a step 502 shown in FIG. 5 during step 206 of FIG. 2. In step 502, the charging event is predicted to be a long duration charging event based on a charging profile for the mobile device. For instance, FIG. 6 shows a block diagram of queue enabler module 306 including a charge event analyzer 602, according to an example embodiment. Charge event analyzer 602 may be configured to perform step 502 of FIG. 5, predicting whether a charging event indicated by charge event indication 312 is a long duration charging event such that queued deferred tasks may be performed.

Charge event analyzer 602 may be configured to perform the prediction of step 502 in various ways. For instance, as shown in FIG. 6, charge event analyzer 602 may receive charging profile data 604. Charging profile data 604 includes data indicative of a charging profile for battery 118 of mobile device 102 (FIG. 1). For instance, charging profile data 604 may be generated based on factors such as a charging history of battery 118, manual input of charging preferences by a user, and/or other factors. Charge event analyzer 602 may analyze charging profile data 604 to predict whether a particular charging event will be a sufficiently long duration charging event so as to enable queued deferred tasks to be executed during the charging event.

Charging profile data 604 may include data in any form, including being in the form of a data structure (e.g., a list, a look up table, an array of data, a database, etc.) that indicates probabilities of charging of battery 118 at various times, including minute by minute, hour by hour, each day of the week, and/or any other periods of time.

Figure 7:
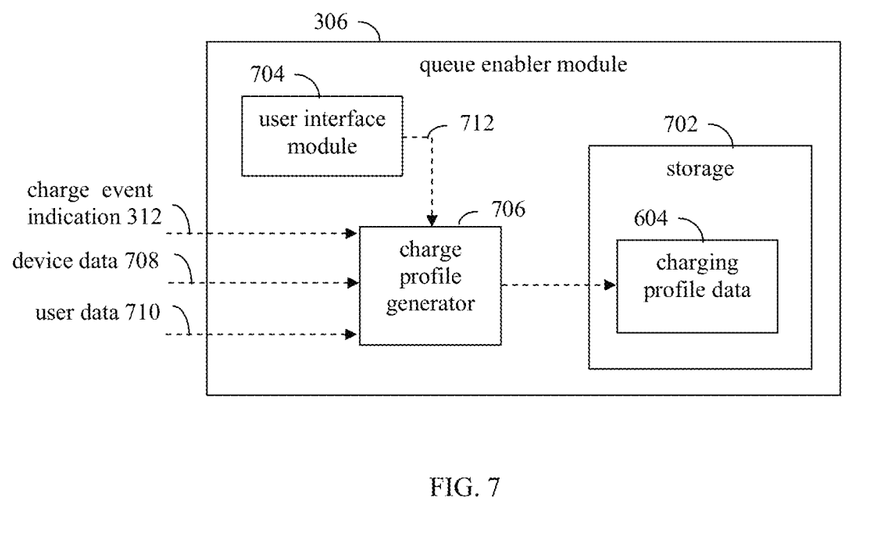
FIG. 7 shows a block diagram of a queue enabler module configured to generate a charging profile, according to an example embodiment.

Charging profile data 604 may be generated in various ways. For instance, FIG. 7 shows a block diagram of queue enabler module 306 configured to generate a charging profile, according to an example embodiment. As shown in FIG. 7, queue enabler module 306 includes storage 702, an optional user interface module 704, and a charge profile generator 706. Queue enabler module 306 of FIG. 7 enables charging profile data 604, which is shown stored in storage 702, to be generated based on one or more of various types of information, including information input by a user, parameters of the mobile device, information regarding one or more users of the mobile device, a history of charging of the battery of the mobile device, and/or other information. Note that storage 702 may include one or more memory devices, hard disk drives, and/or other computer storage media described elsewhere herein or otherwise known.

User interface module 704 may provide a user interface at which a user of mobile device may manually enter charging profile information. For instance, the user may enter times and/or dates during which charging is preferred, and times and/or dates during which charging is not preferred or is forbidden. User interface module 704 may receive the charging profile information from one or more of any type of user interface elements provided by mobile device 102, including a keyboard, a thumb wheel, a pointing device, a roller ball, a stick pointer, a touch sensitive display, any number of virtual interface elements, a voice recognition system, etc. As shown in FIG. 7, user interface module 704 outputs manually entered charge profile information 712.

Queue enabler module 306 may also receive device data 708. Device data 708 may be stored in storage of mobile device 102 (e.g., storage 702). Device data 708 may include information about mobile device 102 and/or battery 118 that may be used to generate charging profile data 604, such as a charging capacity of battery 118, a charging rate of battery 118, a current charge level of battery 118, etc. Furthermore, device data 708 may indicate further sensitive/sensory aspects of mobile device 102, such as usage of GPS (global positioning system) functionality, a microphone, light sensitivity, motion, whether a voice call is being made, calendar contents, and/or processing intensive functions (e.g., data-sync), which may be used to generate charging profile data 604.

Queue enabler module 306 may also receive user data 710. User data 710 may be stored in storage of mobile device 102 (e.g., storage 702), or may be received from a device remote from mobile device 102 (e.g., a "cloud"-based server, a website, a user account, etc.). User data 710 may include information about the user of mobile device 102 that may be used to generate charging profile data 604, such as a calendar of the user (e.g., a calendar tool, such as Microsoft Office Outlook® provided by Microsoft Corporation of Redmond, Wash.) that indicates a schedule of the user.

Queue enabler module 306 may also receive charge event indication 312, which indicates that a charge event has initiated (e.g., battery 118 is coupled to charger 106) and is ongoing, as described above. As shown in FIG. 7, charge profile generator 706 may receive charge event indication 312, device data 708, user data 710, and manually entered charge profile information 712. Any one or more of charge event indication 312, device data 708, user data 710, and manually entered charge profile information 712 may be received, depending on the particular embodiment. Charge profile generator 706 may use charge event indication 312, device data 708, user data 710, and/or manually entered charge profile information 712 to generate charging profile data 604.

For instance, charge profile generator 706 may monitor charge event indication 312 over time to determine periods of time/days in which battery 118 is consistently being charged. Likewise, charge profile generator 706 may monitor charge event indication 312 over time to determine periods of time/days in which there are low likelihoods that battery 118 is being charged. Charge profile generator 706 may generate charging profile data 604 to include probabilities based on the frequency of battery charging at various times. Charge profile generator 706 may generate charging profile data 604 to indicate times/days at which charging of battery 118 may occur with a high probability (e.g., over 75% or other probability), and to indicate times/days at which charging of battery 118 may occur with a low probability (e.g., under 25% or other probability). Charging profile generator 706 may modify charging profile data 604 based on one or more of device data 708, user data 710, and manually entered charge profile information 712. For instance, charge profile generator 706 may modify the generated charging profile data 604, including completely replacing charging profile data 604, with manually entered charge profile information 712 if a user of mobile device 102 desires to override generated charging profile data with manually entered charging profile data. Charging profile generator 706 may modify charging profile data 604 based on capabilities of battery 118 and/or other device data 708 mentioned above or otherwise known. Furthermore, charging profile generator 706 may modify charging profile data 604 based on user data 710 mentioned above or otherwise known.

Figure 8:
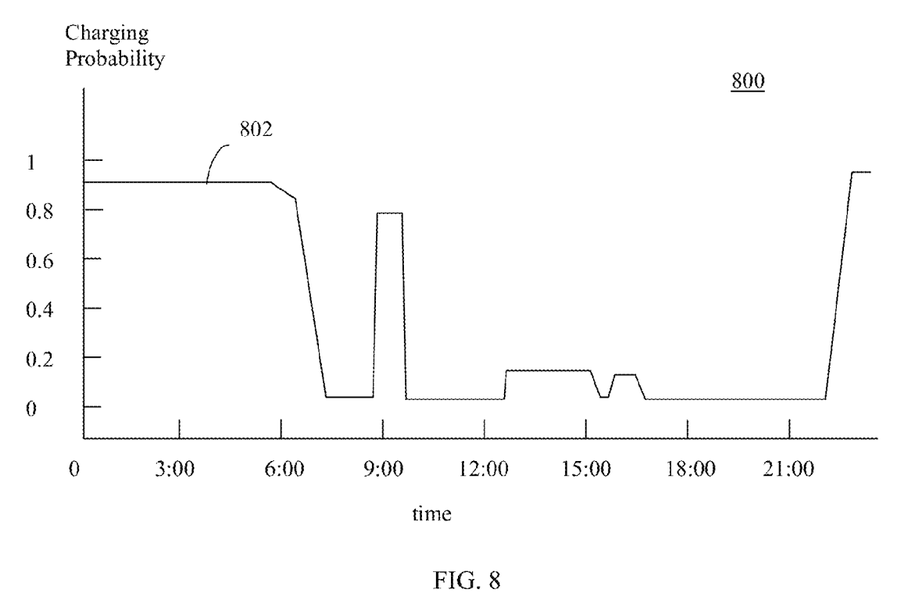
FIG. 8 shows a plot that represents an example battery charging profile, according to an embodiment.

As a result, charging probabilities for different times of day may be determined for a mobile device. For instance, FIG. 8 shows a graph 800 showing a plot 802 of charging probability (Y-axis) versus time (X-axis), according to an example embodiment. Graph 800 is shown in FIG. 8 for purposes of illustration, and is not intended to be limiting, Plot 802 may visually represent charging profile data 604 generated by charge profile generator 706 based on the charging habits of a mobile device of a user. As shown in FIG. 8, plot 802 indicates a charging probability at different times during a particular day. Note that similar charging profile data may be generated for each day of the week, each day of the month, each day of the year, etc., as desired.

In the example of FIG. 8, plot 802 indicates that the user has a high charging probability (e.g., 0.9) during typical sleeping/nighttime hours of approximately 10:00 pm to 7:00 am. This may be because the user couples his/her mobile device to a charger when he/she goes to sleep at night during those times. Other persons who work night shifts, or have other sleep schedules, may have low charging probabilities at nighttime.

Furthermore, plot 802 indicates the user has relatively low charging probabilities from approximately 7:00 am to 1:00 pm. The charging probabilities during this time period are near zero, except for a relatively high charging probability from approximately 9:00 am to 9:30 am (0.8 probability), when the user may couple his/her mobile device to a car-based charger when driving to work. Plot 802 indicates the user has a relatively low charging probability (e.g., 0.15) during the afternoon from approximately 1:00 m to 3:00 pm. For instance, the user may occasionally couple his/her mobile device to his/her computer (e.g., a USB based charger) in the afternoon. Plot 802 further indicates the user has relatively low charging probabilities from approximately 3:00 pm to 10:00 pm. The charging probabilities during this time period are near zero, except for from approximately 4:00 pm to 4:30 pm (0.15 probability), when the user may occasionally couple his/her mobile device to a car-based charger when driving home from work.

According an embodiment, queue enabler module 306 enables queued deferrable task(s) to be executed during a charging event (step 206 of FIG. 2), if the charging is predicted to be a long duration charging event by charge event analyzer 602 (FIG. 6). For example, referring to the example of charging profile represented by plot 802 of FIG. 8, if a charging event occurs and is indicated by charging event indication 312 during the time periods 10:00 pm to 7:00 am or 1:00 pm to 3:00 pm, charge event analyzer 602 may predict the charge event to be a long duration charge event, because the charging profile probabilities during these time periods are relatively high, and the typical time duration during which charging occurs is predicted to be longer than a predetermined threshold (e.g., greater than 1 hour, or other predetermined time threshold). In such case, queue enabler module 306 may generate deferred task enable signal 314 to indicate that the deferrable tasks queued by task queuing module 302 may be enabled. If a charging event occurs and is indicated by charging event indication 312 outside of the time periods 10:00 pm to 7:00 am and 1:00 pm to 3:00 pm, charge event analyzer 602 may predict the charge event to not be a long duration charge event (i.e., to be a relatively short duration charge event), because the charging profile probabilities during these time periods are relatively low, and/or because the predicted charge time durations are relatively low. For instance, 9:00 am to 9:30 am has a high probability of battery charging, but the predicted time duration (30 minutes) may be too short for queued tasks to complete execution. In such case, queue enabler module 306 may generate deferred task enable signal 314 to indicate that the deferrable tasks queued by task queuing module 302 may not be enabled.

As such, according to embodiments, task scheduler 116 of FIG. 1 may defer deferrable tasks until a long duration charging event is predicted to occur. Furthermore, as described above, tasks that are not deferrable may be detected by task scheduler 116, and may therefore be enabled to be performed in real time, without waiting for a charging event.

Figure 9:
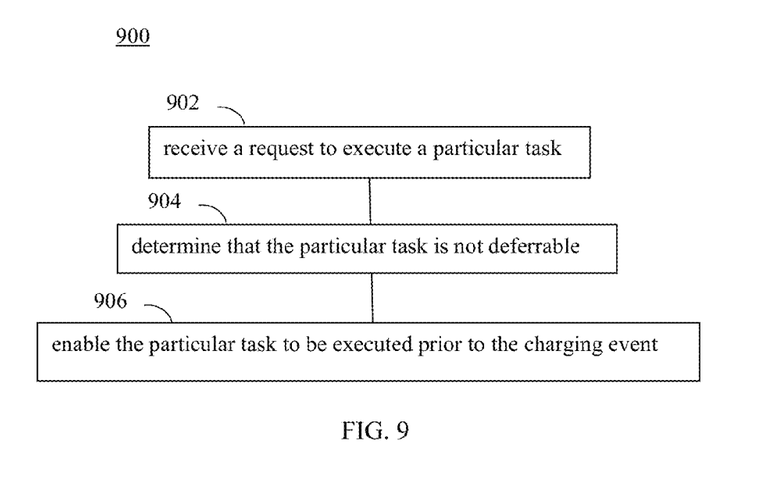
FIG. 9 shows a flowchart providing a process for processing a non-deferrable task, according to an example embodiment.

For instance, FIG. 9 shows a flowchart 900 providing a process for processing a non-deferrable task, according to an example embodiment. In an embodiment, flowchart 900 may be performed by task scheduler 116 of FIG. 1, task scheduler 300 of FIG. 3, and/or by other embodiment. Further structural and operational embodiments will be apparent to persons skilled in the relevant art(s) based on the following discussion regarding flowchart 900.

Flowchart 900 begins with step 902. In step 902, a request to execute a particular task may be received. For instance, referring to FIG. 3, task queuing module 302 may receive perform task request 308 from device operations logic 114 that indicates that a task is desired to be performed by device operations logic 114.

In step 904, the task may be determined to not be deferrable. For instance, as described above, task queuing module 302 may analyze the indicated task to determine whether it is deferrable. In an embodiment, task queuing module 302 may compare the indicated task to a predetermined list of deferrable tasks and/or perform other technique described herein to determine whether the indicated task may be deferred. If the indicated task is not in the predetermined list or fails another deferrable task test, task queuing module 302 may determine that the indicated task is not deferrable.

In step 906, the particular task is enabled to be executed prior to the charging event. For instance, as shown in FIG. 3, task queuing module 302 may generate task enable signal 124, which may be received by device operations logic 114 of FIG. 1. Because the task is determined to not be deferrable, task queuing module 302 generates task enable signal 124 to indicate to device operations logic 114 that the task is enabled, and may be executed in real time (without waiting for a charging event).

Figure 10:
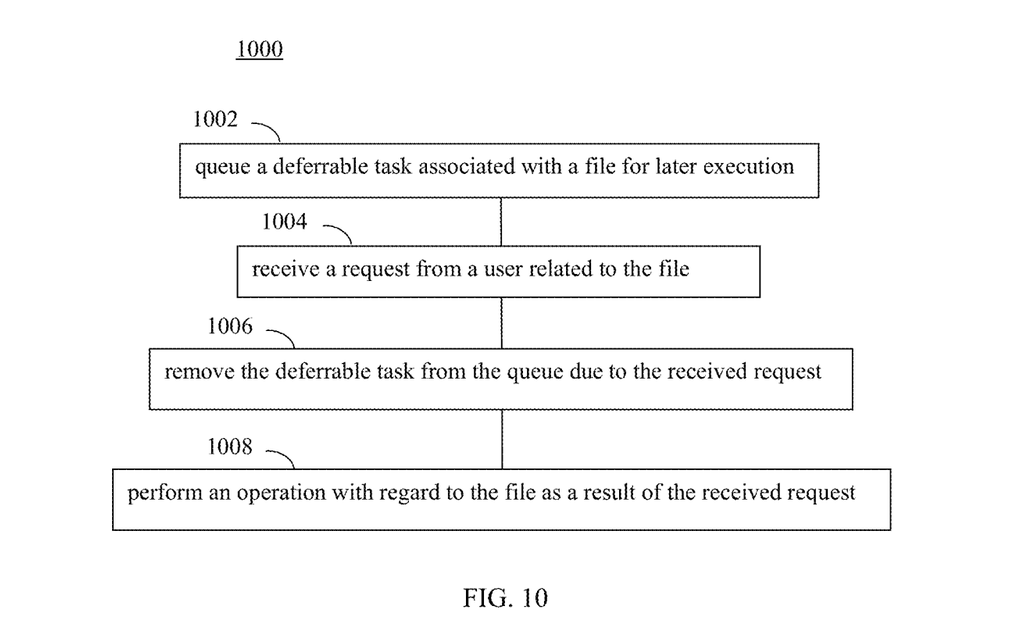
FIG. 10 shows a flowchart providing a process for removing a task from deferred status, according to an example embodiment.

It is noted that tasks that are deferred may later be determined to need to be executed early (prior to a charging event). For instance, FIG. 10 shows a flowchart 1000 providing a process for removing a task from deferred status, according to an example embodiment. In an embodiment, flowchart 1000 may be performed by task scheduler 116 of FIG. 1, task scheduler 300 of FIG. 3, and/or by other embodiment. Further structural and operational embodiments will be apparent to persons skilled in the relevant art(s) based on the following discussion regarding flowchart 1000.

Flowchart 1000 begins with step 1002. In step 1002, a deferrable task associated with a file is queued for later execution. For example, as described above with respect to step 202 of flowchart 200, a deferrable task may be queued for later execution by task queuing module 302.

In step 1004, a request related to the file is received from a user. In an embodiment, a user may make a request with regard to a file that is queued for later execution according to step 1002. The request may be received by task queuing module 302 from device operations logic 114 of FIG. 1. For instance, the file may be a part of an application (e.g., an "app") previously downloaded by the user, but not yet installed, and the user may be requesting to launch or execute the application. The application may be have queued as a deferred task to be installed during a charge event. However, because the user now wants to execute the application, the application installation can no longer be deferred. In another example, the file may have been previously downloaded, but a scanning of the file may have been queued as a deferrable task. The user may now want to access the file, so scanning of the file can no longer be deferred. In still another example, downloading of the file may have been queued as a deferrable task. The user may now want to access the file, so downloading (and optional scanning) of the file can no longer be deferred.

In step 1006, the deferrable task is removed from the queue due to the received request. In an embodiment, task queuing module 302 may clear the task that is associated with the file related to the request in step 1004 from the deferred task queue.

In step 1008, an operation with regard to the file is performed as a result of the received request. In an embodiment, task queuing module 302 may generate task enable signal 124, which may be received by device operations logic 114 of FIG. 1, to indicate to device operations logic 114 that the task is enabled, and may be executed in real time (without waiting for a charging event). As such, the user's request with regard to the file may be immediately fulfilled. In one embodiment, task enable signal 124 may be generated automatically. In another embodiment, a user interface may be generated that requests whether the task should be performed. If a user indicates that the task should be performed, task enable signal 124 may be generated to indicate to device operations logic 114 that the task is enabled. If the user indicates that the task should not performed, then task enable signal 124 may not be generated to indicate to device operations logic 114 that the task is enabled, and optionally, the user's request of step 1004 may be denied. In such case, step 1006 may not be performed (e.g., the deferrable task may remain in the queue).

It is further noted that in some cases, a user may desire that charging of device proceed without any deferred tasks being performed during the charging. For instance, the user may know that the length of time of the charging may be too short for deferred tasks to be performed, or may want the battery of the device to be recharged as quickly as possible and therefore may not want the tasks to drain charge current. As such, a user interface of mobile device 102 may indicate to the user when deferred tasks are to be performed during a charging event. The user interface may further provide an override switch (physical or virtual) or other user interface element (e.g., a "prevent deferred tasks?" query or other displayed graphical user interface element) that the user can interact with to prevent one or more of the deferrable tasks from occurring during charging of battery 118 of mobile device 102.

III. Example Computing Device Embodiments

Task scheduler 116, charge module 120, task scheduler 300, task queuing module 302, charge monitor 304, queue enabler module 306, charge event analyzer 602, user interface module 704, charge profile generator 706, step 502, and flowcharts 200, 900, and 1000 may be implemented in hardware, software, firmware, or any combination thereof. For example, task scheduler 116, charge module 120, task scheduler 300, task queuing module 302, charge monitor 304, queue enabler module 306, charge event analyzer 602, user interface module 704, charge profile generator 706, flowchart 200, step 502, flowchart 900, and/or flowchart 1000 may be implemented as computer program code configured to be executed in one or more processors. Alternatively, task scheduler 116, charge module 120, task scheduler 300, task queuing module 302, charge monitor 304, queue enabler module 306, charge event analyzer 602, user interface module 704, charge profile generator 706, flowchart 200, step 502, flowchart 900, and/or flowchart 1000 may be implemented as hardware logic/electrical circuitry. For instance, in an embodiment, one or more of task scheduler 116, charge module 120, task scheduler 300, task queuing module 302, charge monitor 304, queue enabler module 306, charge event analyzer 602, user interface module 704, charge profile generator 706, flowchart 200, step 502, flowchart 900, and/or flowchart 1000 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
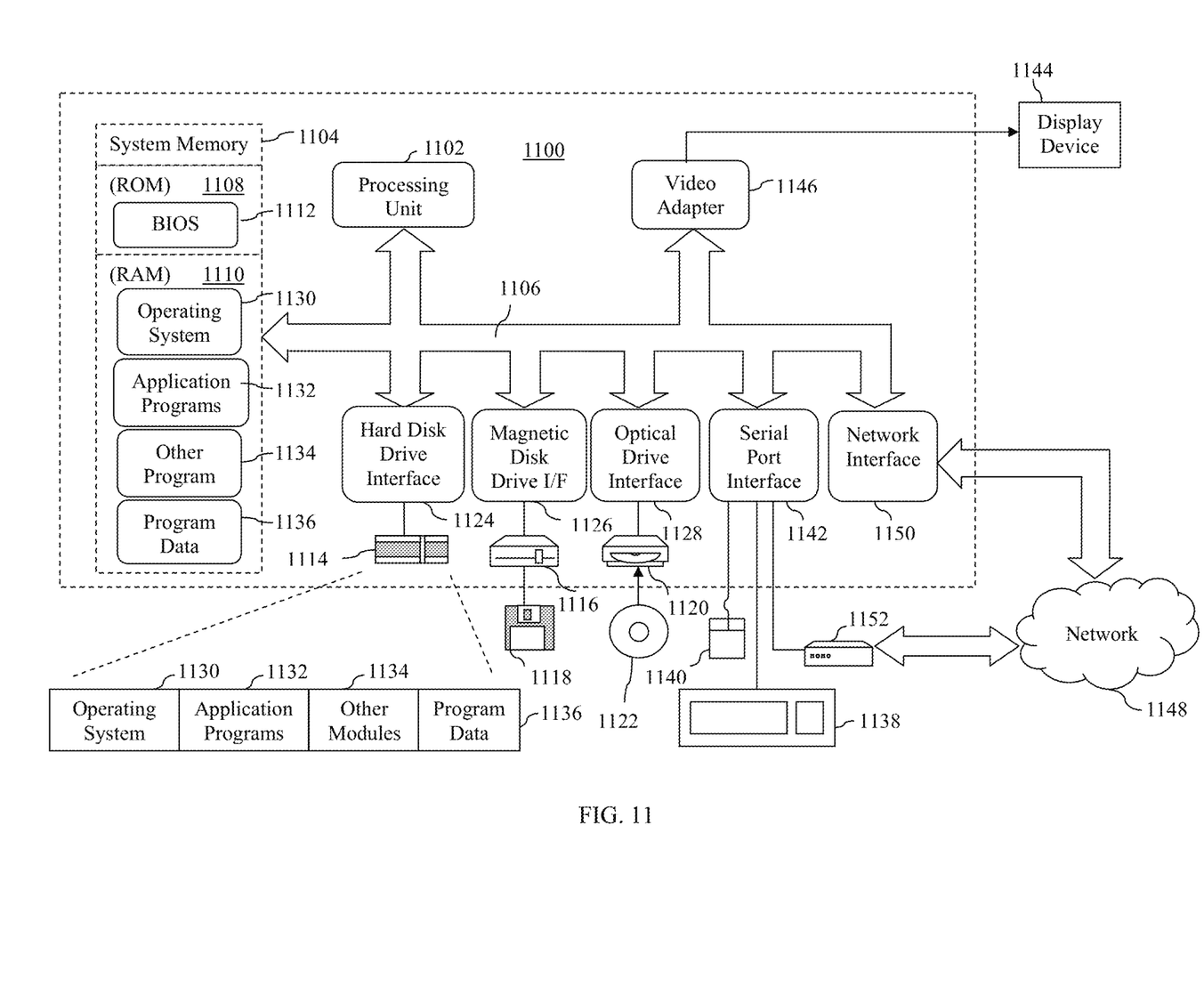
FIG. 11 shows a block diagram of an example computer that may be used to implement embodiments of the present invention.

FIG. 11 depicts an exemplary implementation of a computer 1100 in which embodiments of the present invention may be implemented. For example, mobile device 102 may be implemented in a mobile computer system similar to computer 1100, including one or more features of computer 1100 and/or alternative features. Furthermore, server 104 may be implemented in one or more computer systems similar to computer 1100. Computer 1100 may be a general-purpose computing device in the form of a conventional personal computer, a mobile computer, or a workstation, for example, or computer 1100 may be a special purpose computing device. The description of computer 1100 provided herein is provided for purposes of illustration, and is not intended to be limiting. Embodiments of the present invention may be implemented in further types of computer systems, as would be known to persons skilled in the relevant art(s).

As shown in FIG. 11, computer 1100 includes a processing unit 1102, a system memory 1104, and a bus 1106 that couples various system components including system memory 1104 to processing unit 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, computer program logic for implementing task scheduler 116, charge module 120, task scheduler 300, task queuing module 302, charge monitor 304, queue enabler module 306, charge event analyzer 602, user interface module 704, charge profile generator 706, flowchart 200, step 502, flowchart 900, and/or flowchart 1000 (including any step of flowcharts 200, 900, and 100), and/or further embodiments described herein.

A user may enter commands and information into the computer 1100 through input devices such as keyboard 1138 and pointing device 1140. Other input devices (not shown) may include a microphone, joystick, game pad, satellite dish, scanner, or the like. These and other input devices are often connected to the processing unit 1102 through a serial port interface 1142 that is coupled to bus 1106, but may be connected by other interfaces, such as a parallel port, game port, or a universal serial bus (USB).

A display device 1144 is also connected to bus 1106 via an interface, such as a video adapter 1146. In addition to the monitor, computer 1100 may include other peripheral output devices (not shown) such as speakers and printers.

Computer 1100 is connected to a network 1148 (e.g., the Internet) through an adaptor or network interface 1150, a modem 1152, or other means for establishing communications over the network. Modem 1152, which may be internal or external, is connected to bus 1106 via serial port interface 1142.

As used herein, the terms "computer program medium," "computer-readable medium," and "computer-readable storage medium" are used to generally refer to media such as the hard disk associated with hard disk drive 1114, removable magnetic disk 1118, removable optical disk 1122, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed or loaded by an application, enable computer 1100 to implement features of embodiments of the present invention discussed herein. Accordingly, such computer programs represent controllers of the computer 1100.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a device, comprising:
 queuing at least one deferrable task for later execution;
 detecting an initiation of a charging event for a battery of the device subsequent to said queuing;
 predicting that the charging event is a long duration charging event based on a charging profile for the device, the long duration charging event being a charging event with a duration greater than a predetermined threshold, to enable a deferrable task of the at least one deferrable task to be performed or executed during the charging event; and
 enabling the queued at least one deferrable task to be executed during the charging event after a predetermined amount of time, has elapsed since said detecting.

2. The method of claim 1, further comprising:
 enabling said executing as a result of said predicting.

3. The method of claim 2, further comprising:
 monitoring a charging of the battery of the device over time; and
 generating the charging profile based on said monitoring.

4. The method of claim 2, further comprising:
 enabling a user of the device to manually configure the charging profile.

5. The method of claim 1, further comprising:
 receiving a request to execute a particular task;
 determining that the particular task is not deferrable; and
 enabling the particular task to be executed prior to the charging event.

6. The method of claim 1, further comprising:
 queuing a deferrable task associated with a file for later execution;
 receiving a request from a user related to the file;
 removing the deferrable task from the queue due to the received request; and
 performing an operation with regard to the file as a result of the received request.

7. The method of claim 1, further comprising:
 performing a lightweight scan on a file to generate a scan result;
 transmitting the scan result to a remote server;
 receiving an indication from the remote server whether the file is malicious; and
 queuing a full scan task associated with the file if the file is indicated to not be malicious.

8. The method of claim 1, wherein the at least one deferrable task includes at least one of a file download task, a virus scan task, a backup task, or a configuration management task.

9. A task scheduler in a mobile device, the task scheduler enabling conserving of battery power of the mobile device during mobile operation, the task scheduler, comprising:
 a task queuing module configured to determine that at least one task is deferrable and to queue the at least one deferrable task for later execution;
 a charge monitor configured to detect an initiation of a charging event for a battery of the mobile device subsequent to queuing the at least one deferrable task; and
 a queue enabler module configured to enable the at least one deferrable task to be executed during the charging event and after a predetermined amount of time has elapsed since the detection if the charging event is predicted to be a long duration charging event, the long duration charging event being a charging event with a duration greater than a predetermined threshold, to enable a deferrable task of the at least one deferrable task to be performed or executed during the charging event.

10. The task scheduler of claim 9, wherein the queue enabler module comprises:
a charge event analyzer configured to predict that the charging event is a long duration charging event based on a charging profile for the mobile device; and
the queue enabler module being configured to enable the queued at least one deferrable task to be executed during the charging event as a result of the prediction.

11. The task scheduler of claim 10, wherein the charge event analyzer is configured to determine whether the charging event has a duration greater than the predetermined threshold to predict whether the charging event is a long duration charging event.

12. The task scheduler of claim 10, wherein the queue enabler module is configured to monitor a charging of the battery over time to generate charge history data, and to generate the charging profile based on the charge history data.

13. The task scheduler of claim 10, further comprising:
a user interface module configured to enable a user of the mobile device to manually configure the charging profile.

14. The task scheduler of claim 9, wherein the task queuing module receives a request to execute a particular task, and determines whether the particular task is not deferrable, the queue enabler module enabling the particular task to be executed prior to receiving the charge current if the particular task is determined to be not deferrable.

15. The task scheduler of claim 9, wherein the task queuing module queues a deferrable task associated with a file for later execution, receives a request from a user related to the file, and removes the deferrable task associated with the file from the queue due to the received request.

16. The task scheduler of claim 9, wherein a scanning module of the mobile device performs a lightweight scan on a file to generate a scan result, and the scan result is transmitted from the mobile device to a remote server;
the task queuing module being configured to queue a full scan task associated with the file if the file is indicated to not be malicious in a response received from the remote server.

17. The task scheduler of claim 9, wherein the at least one deferrable task includes at least one of a file download task, a virus scan task, a backup task, or a configuration management task.

18. A computer program product device comprising a computer-readable storage medium having computer program code embodied in said storage medium for enabling a processing unit to perform battery management for a device, the computer program code comprising:
first computer program code that enables the processing unit to queue at least one deferrable task for later execution; and
second computer program code that enables the processing unit to:
predict an initiation of a charging event for a battery of the device that is subsequent to the at least one deferrable task being queued,
predict that the charging event is a long duration charging event based on a charging profile for the device, the long duration charging event being a charging event with a duration greater than a predetermined threshold, to enable a deferrable task of the at least one deferrable task to be performed or executed during the charging event, and
enable the queued at least one deferrable task to begin execution.

19. The computer program product device of claim 18, wherein the second computer program code comprises:
computer program code that enables the processing unit to enable the queued at least one deferrable task to be executed as a result of the prediction that the charging event is a long duration charging event.

20. The method of claim 2, further comprising:
generating the charging profile based at least on a charging capacity of the battery and a charging rate of the battery; and
generating the charging profile further based on at least one of usage of GPS (global positioning system) functionality, a microphone input, light sensitivity, motion, whether a voice call is being made, or calendar contents.

21. A method in a device, comprising:
queuing at least one deferrable task for later execution, the at least one deferrable task including a security operation;
predicting an initiation of a charging event for a battery of the device that is subsequent to the at least one deferrable task being queued;
predicting that the charging event is a long duration charging event based on a charging profile for the device, the long duration charging event being a charging event with a duration greater than a predetermined threshold, to enable a deferrable task of the at least one deferrable task to be performed or executed during the charging event; and
enabling the queued at least one deferrable task to begin execution.

* * * * *